United States Patent
Patil et al.

(10) Patent No.: US 11,399,327 B2
(45) Date of Patent: Jul. 26, 2022

(54) SYSTEMS AND METHODS FOR FAST RETURN TO 5G RAN AFTER FALLBACK TO ANOTHER RAN

(71) Applicant: Verizon Patent and Licensing Inc., Basking Ridge, NJ (US)

(72) Inventors: Sudhakar Reddy Patil, Westlake, TX (US); Helen Osias Eglip, Sammamish, WA (US); Suzann Hua, Beverly Hills, CA (US); Maqbool Chauhan, Keller, TX (US); Ali Imdad Malik, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 51 days.

(21) Appl. No.: 17/031,257

(22) Filed: Sep. 24, 2020

(65) Prior Publication Data

US 2022/0095184 A1    Mar. 24, 2022

(51) Int. Cl.
*H04W 36/12* (2009.01)
*H04W 8/04* (2009.01)
*H04W 36/30* (2009.01)

(52) U.S. Cl.
CPC ............. *H04W 36/12* (2013.01); *H04W 8/04* (2013.01); *H04W 36/305* (2018.08)

(58) Field of Classification Search
CPC . H04W 36/00; H04W 36/0022; H04W 48/12; H04W 76/10; H04W 36/04; H04W 36/14; H04W 36/30; H04W 36/385; H04W 88/08; H04W 60/00; H04L 65/1016; H04L 29/06; H04L 65/1083; H04L 65/1063

USPC ......................................................... 370/331
See application file for complete search history.

(56) References Cited

U.S. PATENT DOCUMENTS

| | | | | |
|---|---|---|---|---|
| 9,888,419 | B2* | 2/2018 | Choi | H04W 36/18 |
| 10,178,585 | B2* | 1/2019 | Huang-Fu | H04L 65/1063 |
| 10,524,166 | B2* | 12/2019 | Youn | H04W 92/02 |
| 11,019,538 | B2* | 5/2021 | Stojanovski | H04W 36/0022 |
| 11,026,129 | B2* | 6/2021 | Zhu | H04W 36/0022 |
| 11,089,521 | B2* | 8/2021 | Yuan | H04W 80/10 |
| 2020/0275332 | A1* | 8/2020 | Chong | H04L 5/00 |
| 2021/0022024 | A1* | 1/2021 | Yao | H04W 28/0268 |
| 2021/0051530 | A1* | 2/2021 | Venkataraman | H04L 65/1053 |
| 2021/0195470 | A1* | 6/2021 | Lei | H04W 76/10 |
| 2021/0258835 | A1* | 8/2021 | Zhu | H04W 24/10 |

OTHER PUBLICATIONS

3GPP TS 24.501 V16.5.1 (Jul. 2020), "3rd Generation Partnership Project; Technical Specification Group Core Network and Terminals; Non-Access-Stratum (NAS) protocol for 5G System (5GS); Stage 3; (Release 16)," Jul. 2020.

* cited by examiner

*Primary Examiner* — Man U Phan

(57) ABSTRACT

Embodiments described herein may provide for the return (e.g., reconnection) of a User Equipment ("UE") to a first radio access network ("RAN") to which the UE was connected, after the UE has been redirected to a second RAN based on the occurrence of an event. The event may include a voice call placed by or to the UE. The return of the UE to the first RAN may occur based on the occurrence of another event, such as the voice call being terminated.

20 Claims, 9 Drawing Sheets

SYSTEMS AND METHODS FOR FAST RETURN TO 5G RAN AFTER FALLBACK TO ANOTHER RAN

BACKGROUND

Wireless network providers may utilize radio access networks ("RANs") that implement different radio access technologies ("RATs"), such as Long-Term Evolution ("LTE") RATs, Fifth Generation ("5G") or New Radio ("NR") RATs, and/or other RATs. One example arrangement of RANs that may be implemented by a wireless network provider may include a Non-Standalone ("NSA") arrangement, in which portions of a 5G core ("5GC") may be correlated to portions of a LTE core (e.g., an Evolved Packet Core ("EPC")). Another example arrangement is a Standalone ("SA") arrangement, in which a 5G RAN may be communicatively coupled to a core network (e.g., a 5GC) without control signaling being handled by a LTE RAN. Some RANs (e.g., in a NSA arrangement or in a SA arrangement) may implement different 5G RATs, such as a "Sub-6 GHz" RAT and/or a millimeter-wave ("mmWave") RAT. In some wireless network configurations, a UE connected to a 5G RAN may be redirected to a RAN implementing a different RAT (e.g., a LTE RAN) in certain situations, such as when a voice call is placed by or received for the UE.

DETAILED DESCRIPTION OF THE PREFERRED EMBODIMENTS

The following detailed description refers to the accompanying drawings. The same reference numbers in different drawings may identify the same or similar elements.

Some wireless networks may cause UEs, connected to a 5G RAN, to connect to another type of RAN (e.g., a LTE RAN) in order to handle mobile-originated ("MO") voice calls (e.g., voice calls initiated by the UEs) or mobile-terminated ("MT") voice calls (e.g., voice calls placed to the UEs), but may not necessarily provide a mechanism for the UEs to reconnect to the 5G RAN upon termination of the voice call. For example, some systems provide the opportunity for the reconnection of a UE to the 5G RAN upon a mobility event (e.g., when the UE moves out of range of the LTE RAN to which the UE was redirected), when the UE enters an "idle" mode (e.g., in which no data is sent to or from the UE), and/or some other type of event or trigger. However, the occurrence of such events may have no particular relationship to the termination of a voice call, and the UE may therefore not receive service from the 5G RAN even if the UE is in range of the 5G RAN in the interim. Embodiments described herein may provide for the return (e.g., reconnection) of a UE to a 5G RAN after the UE has been redirected to another type of RAN (e.g., a LTE RAN) based on a voice call (or other type of event), where the return to the 5G RAN may be based on the termination of the voice call.

Figure 1A:
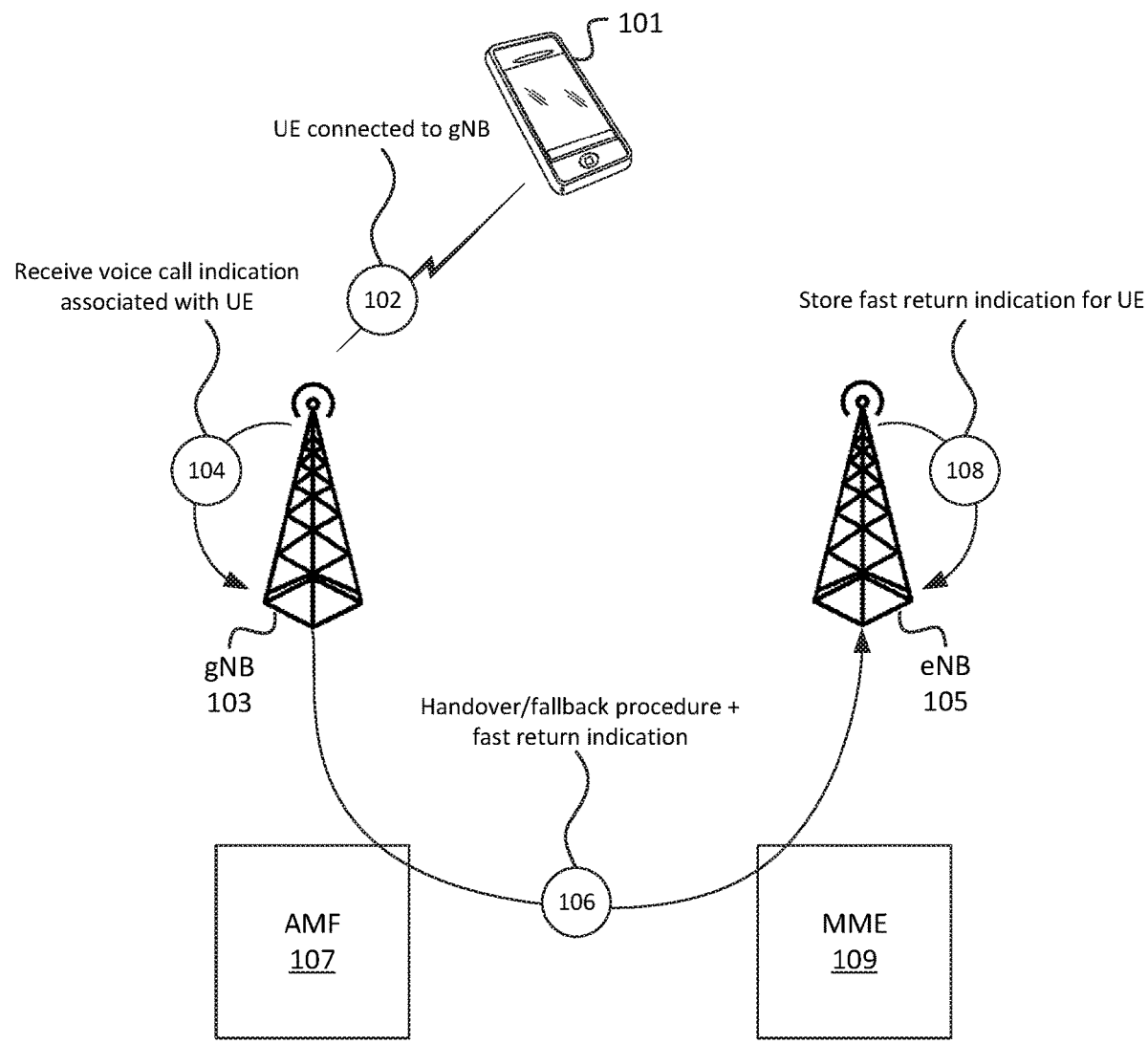
FIGS. 1A-1C illustrate an example overview of one or more embodiments described herein, in which a UE may be redirected from a 5G RAN to a LTE RAN for a voice call, and in which a fast return of the UE to the 5G RAN after the voice call has ended may be performed.

As shown in FIG. 1A, for example, UE 101 may be connected (at 102) to Next Generation Node B ("gNB") 103, which may implement and/or may otherwise be associated with a 5G RAN. At some point, while UE 101 is connected to gNB 103, gNB 103 may receive (at 104) an indication of a voice call for UE 101. For example, gNB 103 may receive the indication from UE 101, and/or from one or more elements of a 5GC, such as Access and Mobility Management Function ("AMF") 107. The voice call indication may, for example, be an indication of a MO voice call (e.g., an indication that UE 101 has placed (e.g., initiated) a voice call), or an indication of a MT voice call (e.g., an indication that a call has been placed to UE 101). Based on receiving (at 104) the voice call indication, gNB 103 may initiate (at 106) a handover procedure, to cause UE 101 to connect to eNB 105 in lieu of to gNB 103. This type of procedure (e.g., handing over UE 101 to eNB 105 based on receiving a voice call indication) may sometimes be referred to as "LTE fallback," "Evolved Packet System ('EPS') fallback," or some other suitable terminology.

In accordance with some embodiments, gNB 103 may provide an indication during the handover procedure (at 106), to indicate that UE 101 was handed over to eNB 105 based on receiving a voice call. As referred to herein, this indication (or other indications with similar functionality) may be referred to as a "fast return" indication. As discussed below, the fast return indication may be used to cause UE 101 to reconnect (or "return") to gNB 103 after the termination of the received voice call.

Figure 1B:
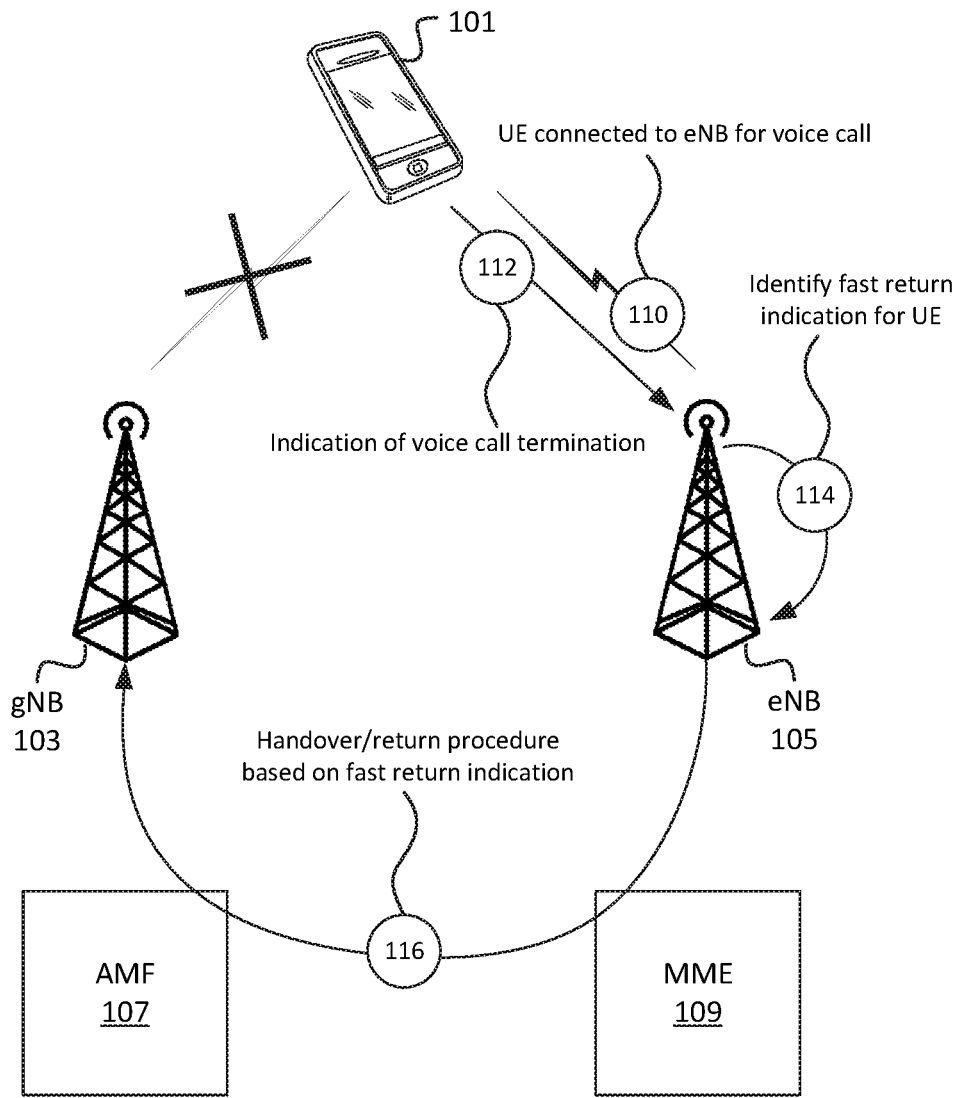

For example, as described in greater detail below, the fast return indication may be received and stored (at 108) by eNB 105 (e.g., via AMF 107 and/or Mobility Management Entity ("MME") 109). Based on the fast return indication, eNB 105 may effect a return of UE 101 to gNB 103 upon termination of the voice call. For example, as shown in FIG. 1B, UE 101 may be connected (at 110) to eNB 105 during the voice call, and the voice call may accordingly be carried by eNB 105 (e.g., eNB 105 may send and/or receive wireless signals to and/or from UE 101 while UE 101 is connected to eNB 105, including signals corresponding to voice call traffic). Further, based on the handover of UE 101 from gNB 103 to eNB 105, UE 101 may no longer be connected to gNB 103 (e.g., as indicated by the "X" in the figure).

At some point after UE 101 has connected (at 110) to eNB 105, the voice call may terminate or end. UE 101, MME 109, and/or some other device or system may indicate (at 112) to eNB 105 that the voice call has terminated. Based on the indication that the voice call has terminated, eNB 105 may identify (at 114) the previously received fast return indication for UE 101. Based on identifying the fast return indication for UE 101, eNB 105 may initiate (at 116) a handover (or "return") procedure of UE 101 to eNB 105.

Figure 1C:
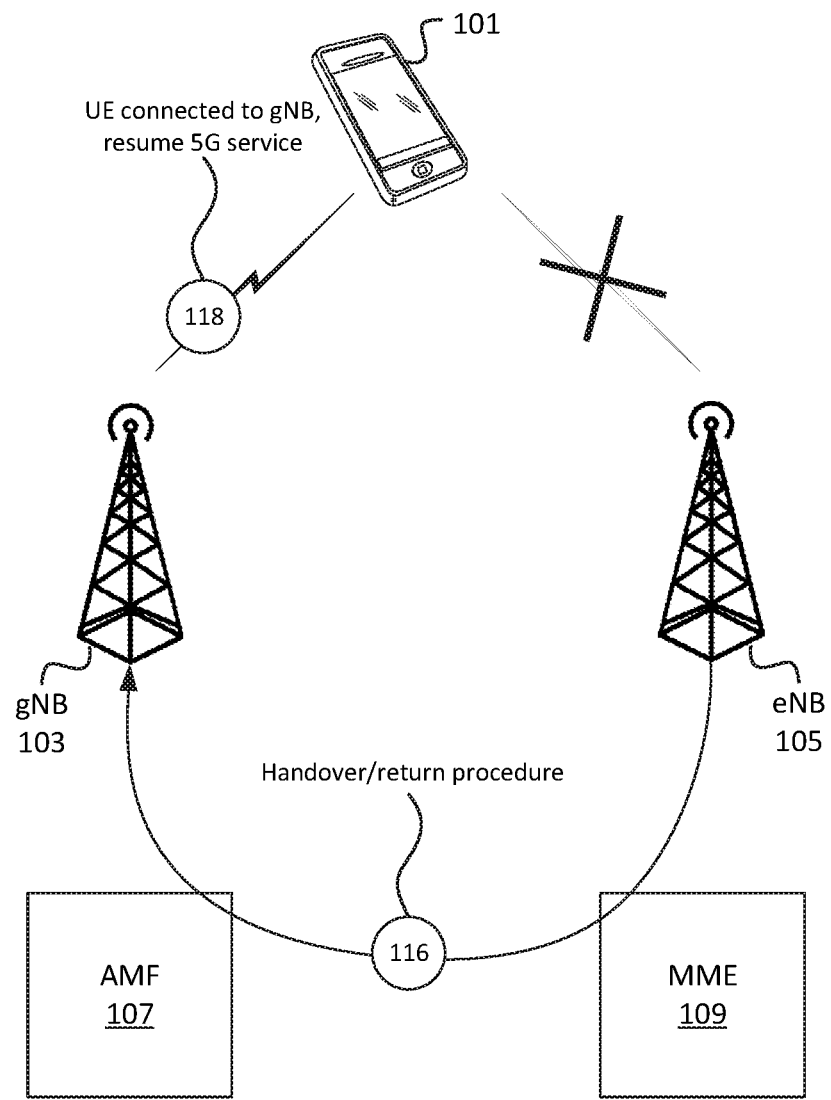

As shown in FIG. 1C, after the handover procedure is performed (at 116), UE 101 may connect (at 118) to gNB 103 and resume receiving 5G service from gNB 103. As noted above, initiating (at 116) the return procedure based on the indication (at 112) of the voice call terminating may allow UE 101 to resume receiving 5G service faster than implementations that wait for mobility events, for UE 101 to enter an "idle" mode, or the like. For example, if UE 101 is participating in an augmented reality ("AR") game that utilizes or otherwise benefits from 5G service prior to the voice call, the user experience of the AR game may be improved by causing UE 101 to resume 5G service relatively quickly.

Figure 2:
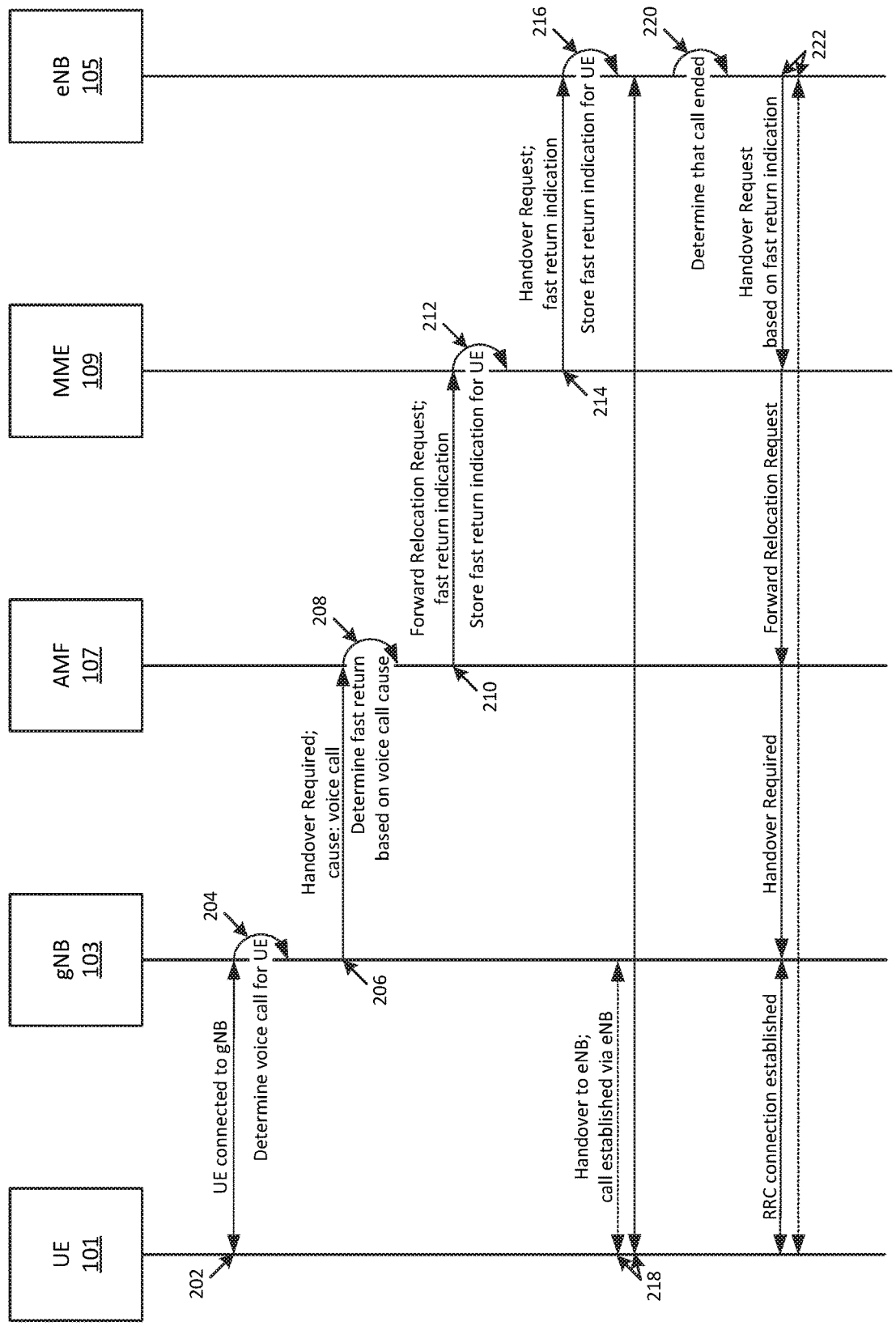
FIG. 2 illustrates an example signal flow for a fast return of a UE to a 5G RAN after the UE has been redirected from the 5G RAN to a LTE RAN based on a voice call for the UE.

FIG. 2 provides an example signal flow in accordance with some embodiments to facilitate the fast return of UE 101 to a 5G RAN after being redirected to another RAN (e.g., a LTE RAN). As noted above, the redirection may be part of a fallback procedure, such as a LTE fallback or EPS fallback procedure occurring in response to a voice call being placed by or to UE 101, and/or in response to some other triggering event. Example signals are provided in FIG. 2 for the sake of explanation. In practice, additional signals may be used to facilitate the handover of UE 101 from gNB 103 to eNB 105, or vice versa.

As shown, for example, UE 101 may be connected (at 202) to gNB 103, which may be implement or may otherwise be associated with a 5G RAN. Via this connection, UE 101 may receive 5G service from gNB 103. For example, UE 101 may send and/or receive wireless communications to and/or from gNB 103 according to one or more 5G RATs or bands, such as a "Millimeter-Wave" band, a "Sub-6 GHz" band, or the like.

While UE 101 is connected to gNB 103, gNB 103 may determine (at 204) that a voice call has been placed by UE 101, and/or that a voice call has been placed to UE 101. For example, gNB 103 may receive a request or other type of indication of the voice call from UE 101, from AMF 107 (e.g., where the indication includes or is associated with a paging request), and/or from some other device or system.

Based on determining (at 204) that a voice call has been placed by or to UE 101, gNB 103 may initiate a fallback procedure, in which UE 101 is redirected to a RAN that implements a different RAT than the RAT (or RATs) implemented by gNB 103. For example, gNB 103 may initiate a LTE fallback procedure, an EPS fallback procedure, or the like, in which UE 101 is caused to connect to eNB 105. The fallback procedure may include gNB 103 outputting (at 206) a handover request to a network element that is communicatively coupled to gNB 103 and that handles mobility, handovers, and/or other functions, such as AMF 107. In some embodiments, the handover request may include a "Handover Required" message from gNB 103 to AMF 107. In some embodiments, gNB 103 may communicate with AMF 107 via a N2 interface.

In some embodiments, the handover request (at 206) may include one or more identifiers associated with UE 101, such as Globally Unique Temporary Identifier ("GUTI"), a Subscription Permanent Identifier ("SUPI"), a Subscription Concealed Identifier ("SUCI"), an International Mobile Subscriber Identity ("IMSI"), an International Mobile Station Equipment Identity (WEI"), and/or some other identifier of UE 101. Based on receiving the handover request with the "voice call" cause, AMF 107 may maintain context information associated with UE 101 (e.g., in lieu of de-provisioning or otherwise removing such context information), as the "voice call" cause my indicate in some embodiments that UE 101 may potentially be handed back over to gNB 103. In this manner, the return to gNB 103 may be faster and/or more efficient, as AMF 107 would not need to reestablish the context information associated with UE 101.

In some embodiments, the handover request may include an indication that UE 101 should be handed over to a base station that implements a LTE RAT (e.g., an eNB), and/or may include a specific indication of which particular eNB to which UE 101 should be handed over. For example, gNB 103 may determine the particular eNB (e.g., eNB 105, in this example) based on measurement reports from UE 101, and/or in some other suitable manner. In some embodiments, the handover request may include a "cause," or some other indicator, indicating that the handover is being requested based on a voice call for UE 101. While examples described herein are provided in the context of a voice call, in some embodiments, similar concepts may apply in response to other types of events or triggers.

AMF 107 may receive the handover request, and may determine (at 208) that UE 101 should be redirected back to gNB 103 after completion of the call. For example, based on the cause or other indication of voice call (or other suitable event) included in the handover request, AMF 107 may determine that UE 101 should be redirected back to gNB 103 once the voice call has ended.

AMF 107 may further output (at 210) a handover request to an element of the target RAN that handles signaling related to mobility, handover, or the like, such as MME 109. In some embodiments, the handover request (at 210) may include a Forward Relocation Request. In some embodiments, this handover request may include an identifier of UE 101 (e.g., a GUTI and/or some other suitable identifier), an identifier of eNB 105, and/or other suitable information to facilitate the handover of UE 101 to eNB 105. In accordance with some embodiments, the handover request may include an indication (e.g., a fast return indication or flag) that UE 101 should be returned to gNB 103 (e.g., upon completion of the voice call and/or some other triggering event). In some embodiments, AMF 107 may communicate with MME 109 via a N26 interface.

MME 109 may also store (at 212) the fast return indication for UE 101. In handover scenarios after UE 101 connects to eNB 105 (as described below), MME 109 may provide the fast return indication to another MME (e.g., a target MME in an inter-MME handover) and/or to another eNB (e.g., a target eNB in an intra-MME handover).

In some embodiments, MME 109 may obtain authentication vectors associated with UE 101, which may include communicating with a core network element that provides authentication services, such as a Home Subscriber Server ("HSS") via a S6a interface. In some embodiments, MME 109 may obtain authentication vectors by communicating with the HSS in lieu of requiring authentication information (e.g., authentication vectors) from AMF 107, from which the Forward Relocation Request was received. For example, based on the fast return indication, MME 109 may determine that the authentication vectors for UE 101 should be obtained by communicating with the HSS, rather than requiring authentication vectors from AMF 107. Obtaining such authentication vectors may be performed proactively by MME 109 upon receiving (at 210) the request (e.g., the Forward Relocation Request including the fast return indication) from AMF 107. This proactive obtaining of authentication vectors may be faster than an authentication procedure in which MME 109 requires authentication information (e.g., authentication vectors) from AMF 107. Further, MME 109 may use such authentication vectors to authenticate UE 101 after obtaining the authentication vectors.

In some embodiments, the Forward Relocation Request (received at 210) may include information indicating that UE 101 is associated with a 5G RAN, such as a "5GMM-REGISTERED" indication. In some embodiments, in situations where MME 109 receives information requests regarding UE 101 after UE 101 connects to eNB 105 (e.g., according to the ensuing signals described below), such as Tracking Area Update ("TAU") requests or other types of information requests, MME 109 may authenticate UE 101 by communicating with an HSS. For example, in situations where UE 101 is indicated as being associated with the "5GMM-REGISTERED" status (and/or some other status that indicates that UE 101 is registered with a 5G network), MME 109 may authenticate UE 101 by communicating with the HSS rather than requiring authentication information from the device or system from which such request was received.

MME 109 may further output (at 214) a handover request to eNB 105. In some embodiments, the handover request message may include a Handover Request message sent via a S1 interface between MME 109 and eNB 105. The handover request (at 214) may include a fast return indication, based on the fast return indication included in the handover request received (at 210) by MME 109 (e.g., a Forward Relocation Request). ENB 105 may store (at 216) the fast return indication, along with one or more identifiers of UE 101 (e.g., a GUTI and/or some other suitable identifier). In inter-eNB handover scenarios (e.g., which may include handovers that occur via signaling between eNB 105 and a target eNB via a X2 interface), eNB 105 may provide the fast return indication, the GUTI of UE 101, and/or other suitable information to indicate to the target eNB that UE 101 is associated with a fast return to gNB 103. In this manner, the target eNB may be able to participate in the fast return of UE 101 to gNB 103 as similarly described below with respect to eNB 105. In some embodiments, as noted above, eNB 105, MME 109, and 107, gNB 103, UE 101, and/or one or more other devices or systems may send and/or receive one or more messages or signals not explicitly shown in FIG. 2, in order to effect the handover of UE 101 to eNB 105 from gNB 103.

Once the handover has been completed (at 218), UE 101 may be connected to eNB 105, and may participate in the voice call via eNB 105. In some embodiments, UE 101 may also no longer be connected to gNB 103 after being handed over to eNB 105 (as indicated by the dashed line between UE 101 and gNB 103). Additionally, or alternatively, UE 101 may remain connected to gNB 103 in an "idle" mode, an "inactive" mode, and/or some other type of connection status that is different from the previous connection state (at 202) of UE 101 to gNB 103.

After the voice call, established and/or carried via eNB 105, has ended, eNB 105 may receive (at 220) an indication that the voice call has ended. For example, UE 101, MME 109, and/or some other device or system may provide an indication to eNB 105 that the voice call has ended. Additionally, or alternatively, eNB 105 may determine that one or more bearers associated with voice call traffic, between UE 101 and eNB 105, has not sent and/or received data for at least a threshold amount of time (e.g., half of one second, one second, etc.). For example, eNB 105 may determine that a bearer having a Quality of Service ("QoS") Class Identifier ("QCI") value of "1," or some other QCI value associated with voice call traffic, may not have carried data to and/or from UE 101 for at least the threshold amount of time.

Based on determining (at 220) that the voice call has ended, and further based on the fast return indication (received at 214) eNB 105 may initiate (at 222) a handover of UE 101 back to gNB 103. In some situations, such as when UE 101 has moved out of range of gNB 103 (and into the range of another gNB), gNB 103 may initiate a handover of UE 101 to another gNB. For example, eNB 105 may receive measurement reports from UE 101 indicating the presence of the other gNB, channel quality information between UE 101 and gNB 103 or another gNB, etc., based on which eNB 105 may determine that UE 101 should be handed over to the other gNB. For the sake of brevity, the example of FIG. 2 assumes that UE 101 will be handed over to gNB 103, from which UE 101 was handed over (at 206-214).

The handover of UE 101 to gNB 103 may include, for example, a Handover Request from eNB 105 to MME 109 (e.g., via a S1 interface), a Forward Relocation Request from MME 109 to AMF 107 (e.g., via a N26 interface), a Handover Required message from AMF 107 to gNB 103 (e.g., via a N2 interface), and one or more Radio Resource Control ("RRC") signals between gNB 103 and UE 101. In some embodiments, the handover (at 222) may include one or more signals or messages in addition to, or in lieu of, these example signals. In some embodiments, as indicated by the dashed line between UE 101 and eNB 105, UE 101 may disconnect from eNB 105. Once UE 101 has been handed back over to gNB 103, UE 101 may resume receiving 5G service from gNB 103 (e.g., resume the 5G services provided at 202 and temporarily interrupted for the voice call).

Figure 3:
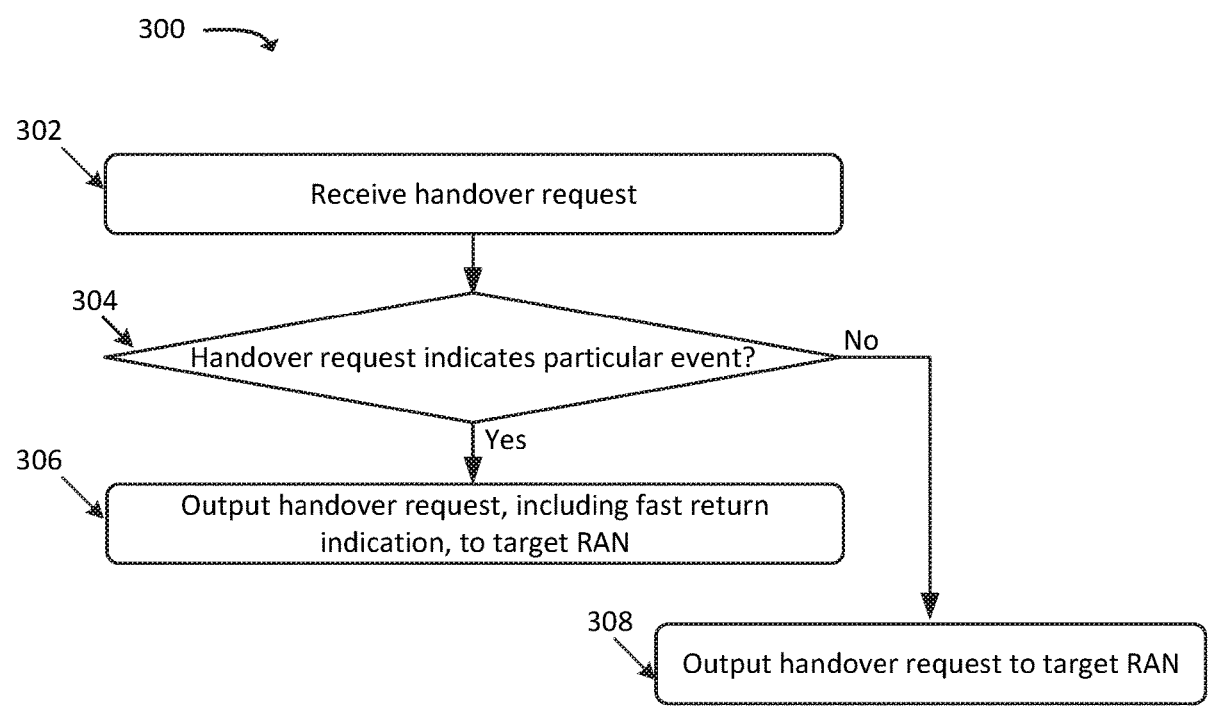
FIG. 3 illustrates an example process for a fast return of a UE to a 5G RAN after the UE has been redirected from the 5G RAN to a LTE RAN based on a voice call for the UE, in accordance with some embodiments.

FIG. 3 illustrates an example process 300 for effecting a fast return of UE 101 to gNB 103 after UE 101 is redirected to eNB 105 based on a triggering event, such as a voice call for UE 101. In some embodiments, some or all of process 300 may be performed by AMF 107. In some embodiments, one or more other devices may perform some or all of process 300 in concert with, and/or in lieu of, AMF 107.

As shown, process 300 may include receiving (at 302) a handover request. For example, AMF 107 may receive a handover request (e.g., a Handover Required message) from gNB 103, to which UE 101 is connected.

Process 300 may further include determining (at 304) whether the handover request indicates the occurrence of a particular event. For example, AMF 107 may determine whether the handover request (e.g., the Handover Required message) includes a cause or some other indication of a particular event. In some embodiments, the particular event may include a voice call placed by UE 101, a voice call placed to UE 101, and/or some other event.

If the handover request indicates (at 304—YES) the particular triggering event (e.g., a voice call), process 300 may additionally include outputting (at 306) a handover request, including a fast return indication, to a target RAN, and/or to one or more mobility or handover elements associated with the target RAN. For example, as discussed above, AMF 107 may output a Forward Relocation Request and/or some other suitable type of message to MME 109. The handover request (e.g., the Forward Relocation Request) may include the fast return indication, to indicate to the target RAN that UE 101 should be handed back to gNB 103 (and/or another gNB, in instances where UE 101 has moved, where gNB 103 has become congested, etc.) upon the occurrence of another triggering event. This other triggering event may be related to the initial triggering event (determined at 304—YES). For example, the initial triggering event (based on which UE 101 is handed over to eNB 105) may be a voice call placed by or to UE 101, while the other triggering event (based on which UE 101 is handed back to gNB 103 or some other gNB) may be a termination of the voice call.

In situations where the handover request does not indicate the particular triggering event (at 304—NO), process 300 may include outputting (at 308) a handover request to the target RAN, without providing a fast return indication. For example, the handover request (received at 302) may be received for some reason other than the occurrence of the triggering event (e.g., a voice call for UE 101). For example, the handover request may be based on mobility of UE 101, such as a movement of UE 101 out of range of gNB 103 to a region in which no other gNBs are present.

Figure 4:
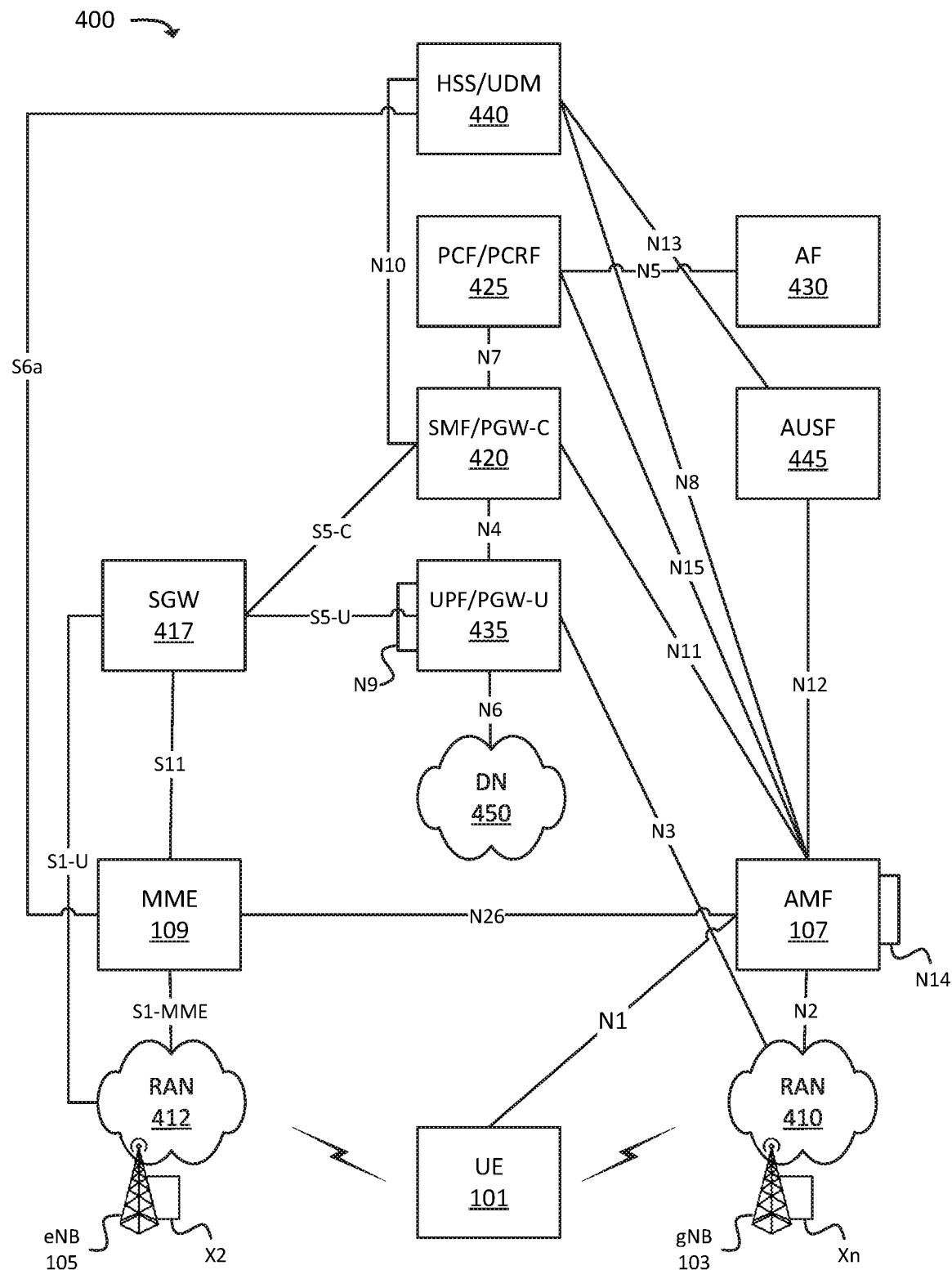
FIG. 4 illustrates an example environment in which one or more embodiments, described herein, may be implemented.

FIG. 4 illustrates an example environment 400, in which one or more embodiments may be implemented. In some embodiments, environment 400 may correspond to a Fifth Generation ("5G") network, and/or may include elements of a 5G network. In some embodiments, environment 400 may correspond to a 5G NSA architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an EPC). As shown, environment 400 may include UE 101, RAN 410 (which may include one or more gNBs 103), RAN 412 (which may include one or more eNBs 105), and various network functions such as AMF 107, MME 109, Serving Gateway ("SGW") 417, Session Management Function ("SMF")/Packet Data Network ("PDN") Gateway ("PGW")-Control plane function ("PGW-C") 420, Policy Control Function ("PCF")/Policy Charging and Rules Function ("PCRF") 425, Application Function ("AF") 430, User Plane Function ("UPF")/PGW-User plane function ("PGW-U") 435, HSS/Unified Data Management ("UDM") 440, and Authentication Server Function ("AUSF") 445. Environment 400 may also include one or more networks, such as Data Network ("DN") 450.

The example shown in FIG. 4 illustrates one instance of each network component or function (e.g., one instance of SMF/PGW-C 420, PCF/PCRF 425, UPF/PGW-U 435, HSS/UDM 440, and/or 445). In practice, environment 400 may include multiple instances of such components or functions. For example, in some embodiments, environment 400 may include multiple "slices" of a core network, where each slice includes a discrete set of network functions (e.g., one slice may include a first instance of SMF/PGW-C 420, PCF/PCRF 425, UPF/PGW-U 435, HSS/UDM 440, and/or 445, while another slice may include a second instance of SMF/PGW-C 420, PCF/PCRF 425, UPF/PGW-U 435, HSS/UDM 440, and/or 445). The different slices may provide differentiated levels of service, such as service in accordance with different Quality of Service ("QoS") parameters.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more network functions described as being performed by another one or more of the devices of environment 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 101 may include a computation and communication device, such as a wireless mobile communication device that is capable of communicating with RAN 410, RAN 412, and/or DN 450. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 450 via RAN 410, RAN 412, and/or UPF/PGW-U 435.

RAN 410 may be, or may include, a 5G RAN that includes one or more base stations (e.g., one or more gNBs 103), via which UE 101 may communicate with one or more other elements of environment 400. UE 101 may communicate with RAN 410 via an air interface (e.g., as provided by gNB 103). For instance, RAN 410 may receive traffic (e.g., voice call traffic, data traffic, messaging traffic, signaling traffic, etc.) from UE 101 via the air interface, and may communicate the traffic to UPF/PGW-U 435, and/or one or more other devices or networks. Similarly, RAN 410 may receive traffic intended for UE 101 (e.g., from UPF/PGW-U 435, AMF 107, and/or one or more other devices or networks) and may communicate the traffic to UE 101 via the air interface.

RAN 412 may be, or may include, a LTE RAN that includes one or more base stations (e.g., one or more eNBs 105), via which UE 101 may communicate with one or more other elements of environment 400. UE 101 may communicate with RAN 412 via an air interface (e.g., as provided by eNB 105). For instance, RAN 410 may receive traffic (e.g., voice call traffic, data traffic, messaging traffic, signaling traffic, etc.) from UE 101 via the air interface, and may communicate the traffic to UPF/PGW-U 435, and/or one or more other devices or networks. Similarly, RAN 410 may receive traffic intended for UE 101 (e.g., from UPF/PGW-U 435, SGW 417, and/or one or more other devices or networks) and may communicate the traffic to UE 101 via the air interface. In some embodiments, eNB 105 may perform one or more functions described herein related to the fast return of UE 101 to RAN 410 (e.g., to gNB 103) after a fallback or other type of procedure based on which UE 101 is handed over to RAN 412 (e.g., to eNB 105).

AMF 107 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 410 and/or gNBs 103, and/or to perform other operations. In some embodiments, the 5G network may include multiple AMFs 107, which communicate with each other via the N14 interface (denoted in FIG. 4 by the line marked "N14" originating and terminating at AMF 107). In some embodiments, AMF 107 may perform one or more functions described herein related to the fast return of UE 101 to RAN 410 (e.g., to gNB 103) after a fallback or other type of procedure based on which UE 101 is handed over to RAN 412 (e.g., to eNB 105).

MME 109 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 412 and/or eNBs 105, and/or to perform other operations. In some embodiments, MME 109 may perform one or more functions described herein related to the fast return of UE 101 to RAN 410 (e.g., to gNB 103) after a fallback or other type of procedure based on which UE 101 is handed over to RAN 412 (e.g., to eNB 105).

SGW 417 may include one or more devices, systems, VNFs, etc., that aggregate traffic received from one or more eNBs 105 and send the aggregated traffic to an external network or device via UPF/PGW-U 435. Additionally, SGW 417 may aggregate traffic received from one or more UPF/PGW-Us 435 and may send the aggregated traffic to one or more eNBs 105. SGW 417 may operate as an anchor for the user plane during inter-eNB handovers and as an anchor for mobility between different telecommunication networks or RANs (e.g., RANs 410 and 412).

SMF/PGW-C 420 may include one or more devices, systems, VNFs, etc., that gather, process, store, and/or provide information in a manner described herein. SMF/PGW-C 420 may, for example, facilitate in the establishment of communication sessions on behalf of UE 101. In some embodiments, the establishment of communications sessions may be performed in accordance with one or more policies provided by PCF/PCRF 425.

PCF/PCRF 425 may include one or more devices, systems, VNFs, etc., that aggregate information to and from the 5G network and/or other sources. PCF/PCRF 425 may receive information regarding policies and/or subscriptions from one or more sources, such as subscriber databases and/or from one or more users (such as, for example, an administrator associated with PCF/PCRF 425).

AF 430 may include one or more devices, systems, VNFs, etc., that receive, store, and/or provide information that may be used in determining parameters (e.g., quality of service parameters, charging parameters, or the like) for certain applications.

UPF/PGW-U 435 may include one or more devices, systems, VNFs, etc., that receive, store, and/or provide data (e.g., user plane data). For example, UPF/PGW-U 435 may receive user plane data (e.g., voice call traffic, data traffic, etc.), destined for UE 101, from DN 450, and may forward the user plane data toward UE 101 (e.g., via RAN 410, SMF/PGW-C 420, and/or one or more other devices). In some embodiments, multiple UPFs 435 may be deployed (e.g., in different geographical locations), and the delivery of content to UE 101 may be coordinated via the N9 interface (e.g., as denoted in FIG. 4 by the line marked "N9" originating and terminating at UPF/PGW-U 435). Similarly, UPF/PGW-U 435 may receive traffic from UE 101 (e.g., via RAN 410, SMF/PGW-C 420, and/or one or more other devices), and may forward the traffic toward DN 450. In some embodiments, UPF/PGW-U 435 may communicate (e.g., via the N4 interface) with SMF/PGW-C 420, regarding user plane data processed by UPF/PGW-U 435.

HSS/UDM 440 and AUSF 445 may include one or more devices, systems, VNFs, etc., that manage, update, and/or store, in one or more memory devices associated with AUSF 445 and/or HSS/UDM 440, profile information associated with a subscriber. AUSF 445 and/or HSS/UDM 440 may perform authentication, authorization, and/or accounting operations associated with the subscriber and/or a communication session with UE 101.

DN 450 may include one or more wired and/or wireless networks. For example, DN 450 may include an Internet Protocol ("IP")-based PDN, a wide area network ("WAN") such as the Internet, a private enterprise network, and/or one or more other networks. UE 101 may communicate, through DN 450, with data servers, other UEs 101, and/or to other servers or applications that are coupled to DN 450. DN 450 may be connected to one or more other networks, such as a public switched telephone network ("PSTN"), a public land mobile network ("PLMN"), and/or another network. DN 450 may be connected to one or more devices, such as content providers, applications, web servers, and/or other devices, with which UE 101 may communicate.

Figure 5:
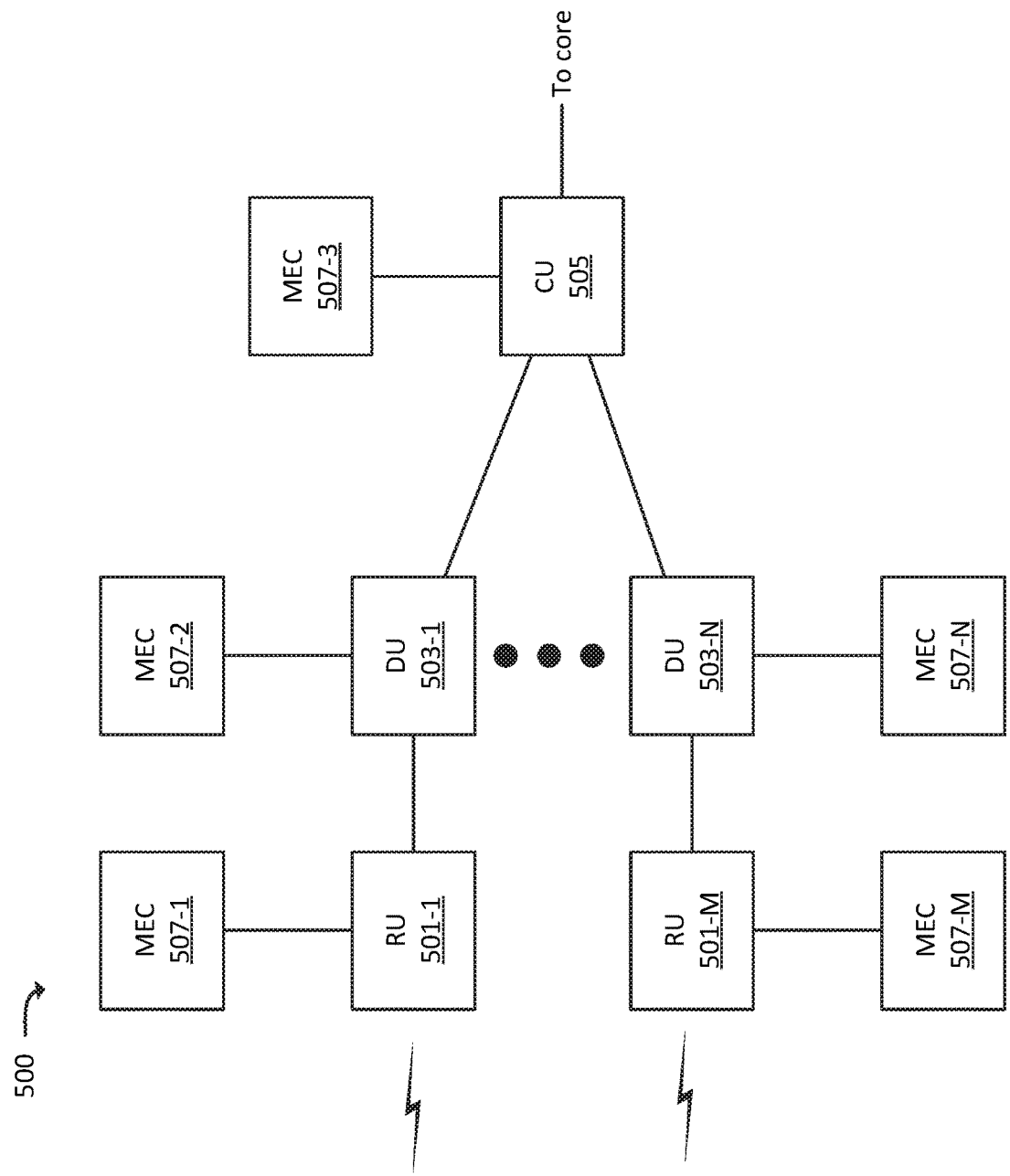
FIG. 5 illustrates an example arrangement of a radio access network ("RAN"), in accordance with some embodiments.

FIG. 5 illustrates an example Distributed Unit ("DU") network 500, which may be included in and/or implemented by one or more RANs (e.g., RAN 410). In some embodiments, a particular RAN may include one DU network 500. In some embodiments, a particular RAN may include multiple DU networks 500. In some embodiments, DU network 500 may correspond to a particular gNB 103 of a 5G RAN (e.g., RAN 410). In some embodiments, DU network 500 may correspond to multiple gNBs 103. In some embodiments, DU network 500 may correspond to one or more other types of base stations of one or more other types of RANs. As shown, DU network 500 may include Central Unit ("CU") 505, one or more Distributed Units ("DUs") 503-1 through 503-N (referred to individually as "DU 503," or collectively as "DUs 503"), and one or more Radio Units ("RUs") 501-1 through 501-M (referred to individually as "RU 501," or collectively as "RUs 501").

CU 505 may communicate with a core of a wireless network (e.g., may communicate with one or more of the devices or systems described above with respect to FIG. 4, such as AMF 107 and/or UPF/PGW-U 435). In the uplink direction (e.g., for traffic from UEs 101 to a core network), CU 505 may aggregate traffic from DUs 503, and forward the aggregated traffic to the core network. In some embodiments, CU 505 may receive traffic according to a given protocol (e.g., Radio Link Control ("RLC")) from DUs 503, and may perform higher-layer processing (e.g., may aggregate/process RLC packets and generate Packet Data Convergence Protocol ("PDCP") packets based on the RLC packets) on the traffic received from DUs 503.

In accordance with some embodiments, CU 505 may receive downlink traffic (e.g., traffic from the core network) for a particular UE 101, and may determine which DU(s) 503 should receive the downlink traffic. DU 503 may include one or more devices that transmit traffic between a core network (e.g., via CU 505) and UE 101 (e.g., via a respective RU 501). DU 503 may, for example, receive traffic from RU 501 at a first layer (e.g., physical ("PHY") layer traffic, or lower PHY layer traffic), and may process/aggregate the traffic to a second layer (e.g., upper PHY and/or RLC). DU 503 may receive traffic from CU 505 at the second layer, may process the traffic to the first layer, and provide the processed traffic to a respective RU 501 for transmission to UE 101.

RU 501 may include hardware circuitry (e.g., one or more RF transceivers, antennas, radios, and/or other suitable hardware) to communicate wirelessly (e.g., via an RF interface) with one or more UEs 101, one or more other DUs 503 (e.g., via RUs 501 associated with DUs 503), and/or any other suitable type of device. In the uplink direction, RU 501 may receive traffic from UE 101 and/or another DU 503 via the RF interface and may provide the traffic to DU 503. In the downlink direction, RU 501 may receive traffic from DU 503, and may provide the traffic to UE 101 and/or another DU 503.

RUs 501 may, in some embodiments, be communicatively coupled to one or more Multi-Access/Mobile Edge Computing ("MEC") devices, referred to sometimes herein simply as ("MECs") 507. For example, RU 501-1 may be communicatively coupled to MEC 507-1, RU 501-M may be communicatively coupled to MEC 507-M, DU 503-1 may be communicatively coupled to MEC 507-2, DU 503-N may be communicatively coupled to MEC 507-N, CU 505 may be communicatively coupled to MEC 507-3, and so on. MECs 507 may include hardware resources (e.g., configurable or provisionable hardware resources) that may be configured to provide services and/or otherwise process traffic to and/or from UE 101, via a respective RU 501.

For example, RU 501-1 may route some traffic, from UE 101, to MEC 507-1 instead of to a core network (e.g., via DU 503 and CU 505). MEC 507-1 may process the traffic, perform one or more computations based on the received traffic, and may provide traffic to UE 101 via RU 501-1. In this manner, ultra-low latency services may be provided to UE 101, as traffic does not need to traverse DU 503, CU 505, and an intervening backhaul network between DU network 500 and the core network.

Figure 6:
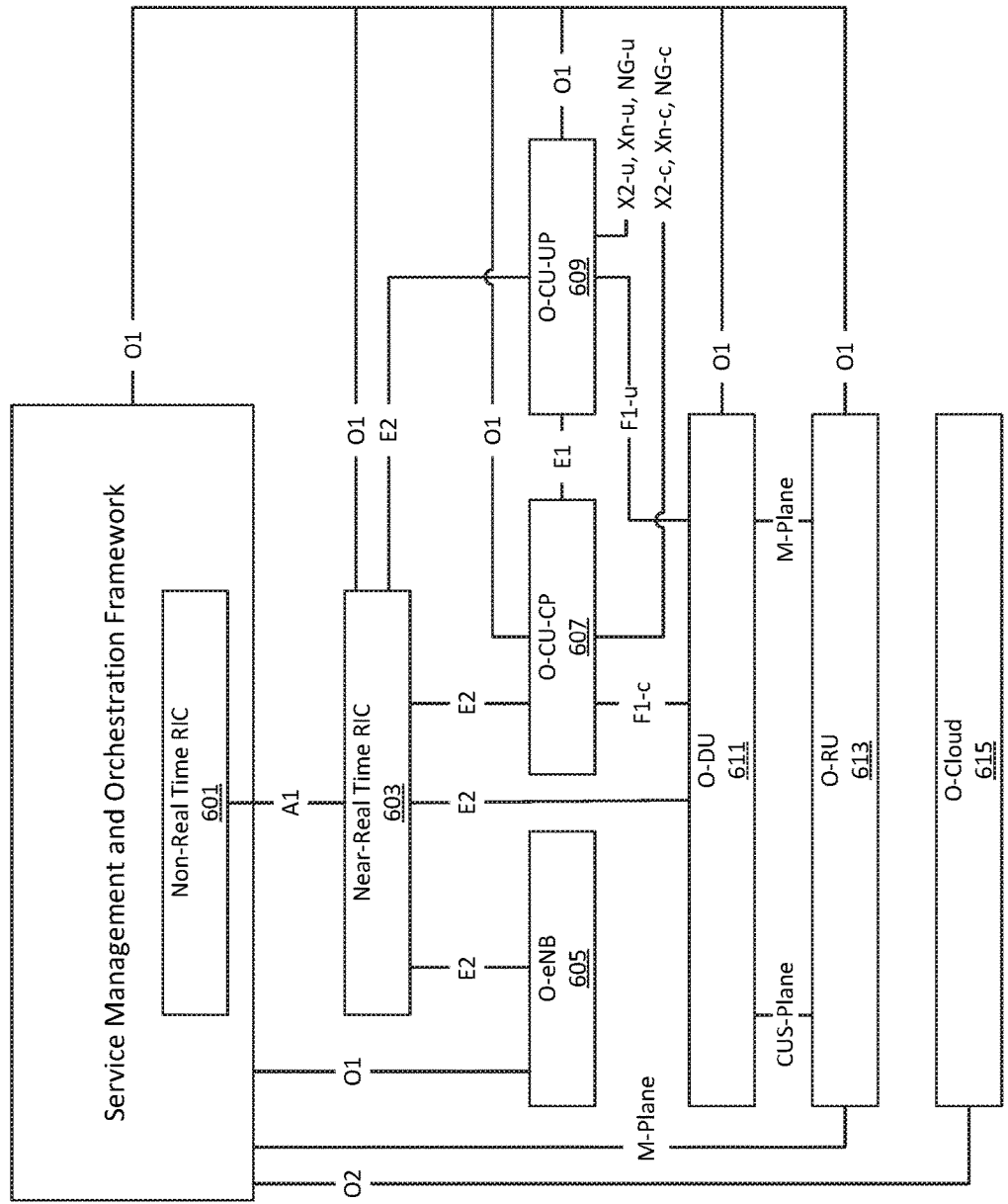
FIG. 6 illustrates an example arrangement of an Open RAN ("O-RAN") environment in which one or more embodiments, described herein, may be implemented.

FIG. 6 illustrates an example O-RAN environment 600, which may correspond to RAN 410, RAN 412, and/or DU network 500. For example, RAN 410, RAN 412, and/or DU network 500 may include one or more instances of O-RAN environment 600, and/or one or more instances of O-RAN environment 600 may implement RAN 410, RAN 412, DU network 500, and/or some portion thereof. As shown, O-RAN environment 600 may include Non-Real Time Radio Intelligent Controller ("RIC") 601, Near-Real Time RIC 603, O-eNB 605, O-CU-Control Plane ("O-CU-CP") 607, O-CU-User Plane ("O-CU-UP") 609, O-DU 611, O-RU 613, and O-Cloud 615. In some embodiments, O-RAN environment 600 may include additional, fewer, different, and/or differently arranged components.

In some embodiments, some or all of the elements of O-RAN environment 600 may be implemented by one or more configurable or provisionable resources, such as virtual machines, cloud computing systems, physical servers, and/or other types of configurable or provisionable resources. In some embodiments, some or all of O-RAN environment 600 may be implemented by, and/or communicatively coupled to, one or more MECs 507.

Non-Real Time MC 601 and Near-Real Time RIC 603 may receive performance information (and/or other types of information) from one or more sources, and may configure other elements of O-RAN environment 600 based on such performance or other information. For example, Near-Real Time RIC 603 may receive performance information, via one or more E2 interfaces, from O-eNB 605, O-CU-CP 607, and/or O-CU-UP 609, and may modify parameters associated with O-eNB 605, O-CU-CP 607, and/or O-CU-UP 609 based on such performance information. Similarly, Non-Real Time RIC 601 may receive performance information associated with O-eNB 605, O-CU-CP 607, O-CU-UP 609, and/or one or more other elements of O-RAN environment 600 and may utilize machine learning and/or other higher level computing or processing to determine modifications to the configuration of O-eNB 605, O-CU-CP 607, O-CU-UP 609, and/or other elements of O-RAN environment 600. In some embodiments, Non-Real Time RIC 601 may generate machine learning models based on performance information associated with O-RAN environment 600 or other sources, and may provide such models to Near-Real Time RIC 603 for implementation.

O-eNB 605 may perform functions similar to those described above with respect to eNB 105. For example, O-eNB 605 may facilitate wireless communications between UE 101 and a core network. O-CU-CP 607 may perform control plane signaling to coordinate the aggregation and/or distribution of traffic via one or more DUs 503, which may include and/or be implemented by one or more O-DUs 611, and O-CU-UP 609 may perform the aggregation and/or distribution of traffic via such DUs 503 (e.g., O-DUs 611). O-DU 611 may be communicatively coupled to one or more RUs 501, which may include and/or may be implemented by one or more O-RUs 613. In some embodiments, O-Cloud 615 may include or be implemented by one or more MECs 507, which may provide services, and may be communicatively coupled, to O-CU-CP 607, O-CU-UP 609, O-DU 611, and/or O-RU 613 (e.g., via an O1 and/or O2 interface).

Figure 7:
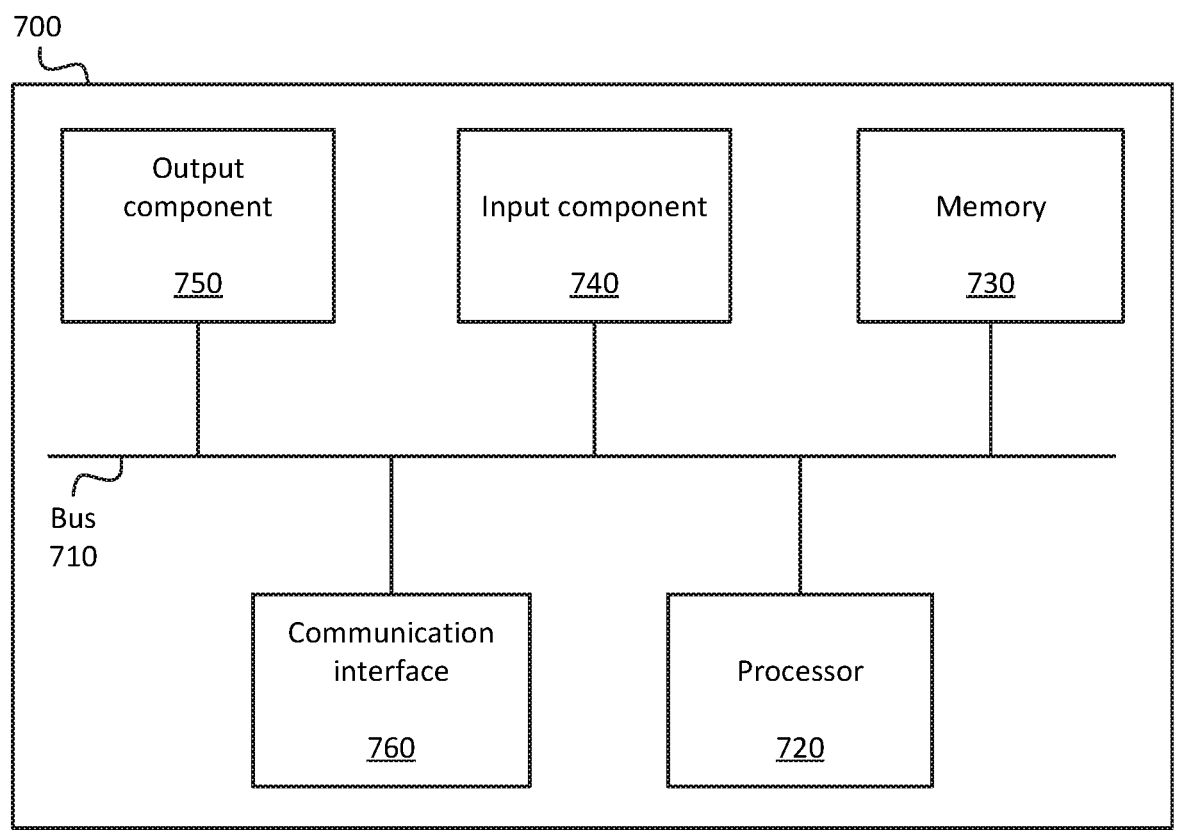
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1C, 2, and 3), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors to:
receive a first request to hand over a User Equipment ("UE"), that is currently connected to a first radio access network ("RAN"), to a second RAN, wherein the first request includes a first indication of an occurrence of a first event;
determine, based on receiving the first request, including the first indication of the occurrence of the first event, that the UE should be handed over from the second RAN to the first RAN after an occurrence of a second event;
output, toward the second RAN, a second request to the second RAN to hand the UE over to the second RAN, wherein the second request includes a second indication indicating that the UE should be handed over from the second RAN to the first RAN after the occurrence of the second event,
wherein the UE is handed over from the first RAN to the second RAN based on the second request,
wherein the second RAN determines, after the UE is handed over to the second RAN, that the second event has occurred, and
wherein the second RAN requests a handover of the UE to the first RAN based on determining that the second event has occurred;
receive a third request to hand over the UE while the UE is connected to the first RAN, to the second RAN, wherein the third request does not include an indication of an occurrence of the first event; and
output, toward the second RAN, a fourth request to the second RAN to hand the UE over to the second RAN, wherein the fourth request does not include an indication indicating that the UE should be handed over from the second RAN to the first RAN.

2. The device of claim 1, wherein the first request is received from a Next Generation Node B ("gNB") of the first RAN.

3. The device of claim 1,
wherein the first event is associated with a voice call associated with the UE, wherein the voice call includes at least one of:

a mobile-originated ("MO") voice call, or a mobile-terminated ("MT") voice call; and wherein the second event includes an ending of the voice call associated with the UE.

4. The device of claim 1, wherein outputting the second request includes outputting the second request to a Mobility Management Entity ("MME") associated with the second RAN.

5. The device of claim 4, wherein the MME authenticates the UE, based on the second request, by communicating with a Home Subscriber Server ("HSS").

6. The device of claim 1, wherein at least one of the receiving, determining, or outputting is performed by an Access and Mobility Management Function ("AMF") associated with the first RAN.

7. A non-transitory computer-readable medium, storing a plurality of processor-executable instructions to:

receive a first request to hand over a User Equipment ("UE"), that is currently connected to a first radio access network ("RAN"), to a second RAN, wherein the first request includes a first indication of an occurrence of a first event;

determine, based on receiving the first request, including the first indication of the occurrence of the first event, that the UE should be handed over from the second RAN to the first RAN after an occurrence of a second event;

output, toward the second RAN, a second request to the second RAN to hand the UE over to the second RAN, wherein the second request includes a second indication indicating that the UE should be handed over from the second RAN to the first RAN after the occurrence of the second event, wherein the UE is handed over from the first RAN to the second RAN based on the second request, wherein the second RAN determines, after the UE is handed over to the second RAN, that the second event has occurred, and wherein the second RAN requests a handover of the UE to the first RAN based on determining that the second event has occurred;

receive a third request to hand over the UE while the UE is connected to the first RAN, to the second RAN, wherein the third request does not include an indication of an occurrence of the first event; and output, toward the second RAN, a fourth request to the second RAN to hand the UE over to the second RAN, wherein the fourth request does not include an indication indicating that the UE should be handed over from the second RAN to the first RAN.

8. The non-transitory computer-readable medium of claim 7, wherein the first request is received from a Next Generation Node B ("gNB") of the first RAN.

9. The non-transitory computer-readable medium of claim 7, wherein the first event is associated with a voice call associated with the UE, wherein the voice call includes at least one of:

a mobile-originated ("MO") voice call, or a mobile-terminated ("MT") voice call; and wherein the second event includes an ending of the voice call associated with the UE.

10. The non-transitory computer-readable medium of claim 7, wherein outputting the second request includes outputting the second request to a Mobility Management Entity ("MME") associated with the second RAN.

11. The non-transitory computer-readable medium of claim 10, wherein the MME authenticates the UE, based on the second request, by communicating with a Home Subscriber Server ("HSS").

12. A method, performed by one or more devices, comprising:

receiving a first request to hand over a User Equipment ("UE"), that is currently connected to a first radio access network ("RAN"), to a second RAN, wherein the first request includes a first indication of an occurrence of a first event;

determining, based on receiving the first request, including the first indication of the occurrence of the first event, that the UE should be handed over from the second RAN to the first RAN after an occurrence of a second event;

outputting, toward the second RAN, a second request to the second RAN to hand the UE over to the second RAN, wherein the second request includes a second indication indicating that the UE should be handed over from the second RAN to the first RAN after the occurrence of the second event, wherein the UE is handed over from the first RAN to the second RAN based on the second request, wherein the second RAN determines, after the UE is handed over to the second RAN, that the second event has occurred, and wherein the second RAN requests a handover of the UE to the first RAN based on determining that the second event has occurred;

receiving a third request to hand over the UE while the UE is connected to the first RAN, to the second RAN, wherein the third request does not include an indication of an occurrence of the first event; and outputting, toward the second RAN, a fourth request to the second RAN to hand the UE over to the second RAN, wherein the fourth request does not include an indication indicating that the UE should be handed over from the second RAN to the first RAN.

13. The method of claim 12, wherein the first request is received from a Next Generation Node B ("gNB") of the first RAN.

14. The method of claim 12, wherein the first event is associated with a voice call associated with the UE, wherein the voice call includes at least one of:

a mobile-originated ("MO") voice call, or a mobile-terminated ("MT") voice call; and wherein the second event includes an ending of the voice call associated with the UE.

15. The method of claim 14, wherein outputting the second request includes outputting the second request to a Mobility Management Entity ("MME") associated with the second RAN.

16. The method of claim 15, wherein the MME authenticates the UE, based on the second request, by communicating with a Home Subscriber Server ("HSS").

17. The method of claim 12, wherein the one or more devices include an Access and Mobility Management Function ("AMF") associated with the first RAN.

18. The method of claim 12, wherein the first event includes an establishment of a particular communication session, and wherein the second event includes a termination of the particular communication session.

19. The device of claim 1, wherein the first event includes an establishment of a particular communication session, and wherein the second event includes a termination of the particular communication session.

20. The non-transitory computer-readable medium of claim 7, wherein the first event includes an establishment of a particular communication session, and wherein the second event includes a termination of the particular communication session.

\* \* \* \* \*